US010126181B2

(12) United States Patent
Nikolovski (10) Patent No.: US 10,126,181 B2
(45) Date of Patent: Nov. 13, 2018

(54) TEMPERATURE SENSOR, ELECTRONIC UNIT INTERACTING WITH SUCH A SENSOR, AND RELATED METHOD AND COMPUTER PROGRAM

(71) Applicant: COMMISSARIAT A L'ENERGIE ATOMIQUE ET AUX ENERGIES ALTERNATIVES, Paris (FR)

(72) Inventor: Jean-Pierre Nikolovski, Carry le Rouet (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 154 days.

(21) Appl. No.: 15/317,430

(22) PCT Filed: Jun. 9, 2015

(86) PCT No.: PCT/EP2015/062851
§ 371 (c)(1),
(2) Date: Dec. 9, 2016

(87) PCT Pub. No.: WO2015/189217
PCT Pub. Date: Dec. 17, 2015

(65) Prior Publication Data
US 2017/0122816 A1    May 4, 2017

(30) Foreign Application Priority Data

Jun. 10, 2014 (FR) ...................... 14 55242

(51) Int. Cl.
*G01K 1/00* (2006.01)
*G01K 7/00* (2006.01)
(Continued)

(52) U.S. Cl.
CPC .................... *G01K 11/26* (2013.01)

(58) Field of Classification Search
USPC ................................... 374/117, 141
See application file for complete search history.

(56) References Cited

U.S. PATENT DOCUMENTS

2005/0244014 A1    11/2005    Elko et al.
2014/0377091 A1*   12/2014    Delevoye .......... A61M 5/14212
                                              417/322

FOREIGN PATENT DOCUMENTS

DE    10 2011 056 533 A1    6/2013
EP         1 591 764 A1    11/2005
WO    WO 2014/041306 A1    3/2014

OTHER PUBLICATIONS

International Search Report dated Jun. 26, 2015, in PCT/EP2015/062851 filed Jun. 9, 2015.
(Continued)

*Primary Examiner* — Mirellys Jagan
(74) *Attorney, Agent, or Firm* — Oblon, McClelland, Maier & Neustadt, L.L.P.

(57) ABSTRACT

A temperature sensor including: a resonant structure vibrating to resonate at a resonating frequency that varies depending on temperature of a plate; at least one sound wave transmitter mounted onto the resonant structure to make the resonant structure vibrate at the resonating frequency; a sound wave receiver mounted onto the resonant structure and configured to capture sound waves propagating within the suspended structure; and connection elements configured to connect the at least one transmitter and receiver to an electronic unit outside the temperature sensor. The connection elements include a connector including four contact points including first and second contact points conveying a stereophonic sound signal, a third contact point providing a mass reference, and a fourth contact point conveying a microphone signal. The connection elements are configured to connect the at least one transmitter to the first and second (Continued)

contact points and connect the receiver to the fourth contact point.

15 Claims, 3 Drawing Sheets (51) Int. Cl.
*G01K 13/00* (2006.01)
*G01K 11/26* (2006.01)

(56) References Cited

OTHER PUBLICATIONS

French Search Report dated Dec. 19, 2014, in French Application 14 55242 filed Jun. 10, 2014.
U.S. Appl. No. 14/345,510, filed Mar. 18, 2014, 2014/0377091 A1, Elisabeth Delevoye et al.

* cited by examiner

TEMPERATURE SENSOR, ELECTRONIC UNIT INTERACTING WITH SUCH A SENSOR, AND RELATED METHOD AND COMPUTER PROGRAM

TECHNICAL DOMAIN

The domain of the invention is temperature sensors. The invention relates more particularly to a temperature sensor for making a measurement based on the variation of elastic properties and therefore the velocity of sound waves propagating in a resonant structure in the form of Lamb waves, as a function of the temperature.

STATE OF PRIOR ART

One known method for measuring the temperature consists of making use of the influence of temperature on the spectral characteristics of sound waves propagating in a thin plate.

In particular, patent application WO 2014/041306 A1 discloses a system for detection and positioning of a stylus on a touch surface of an interactive type tablet connected to a microcomputer. Since the spectral characteristics of the signal used to make this detection and positioning are very sensitive to temperature, this patent application discloses how the system can be equipped with a object temperature measurement module and then the signal used for detection/positioning can be corrected. The temperature measurement module makes use of the effect of temperature variations on the frequency shift, particularly on the shift of at least one resonant frequency of the object. This module comprises a sound waves transmission/reception microcontroller, possible controlled by a microcomputer.

Although the temperature measurement is precise and the response time is short, the solution described in this patent application does not satisfy the need for a compact temperature sensor with low electricity consumption and a particularly low cost price (typically less than one Euro).

PRESENTATION OF THE INVENTION

The purpose of the invention is to satisfy this need and to disclose a temperature sensor for this purpose comprising:
- a resonant structure that will be vibrated to resonate at a resonant frequency that varies as a function of the temperature of the resonant structure;
- at least one sound waves transmitter mounted on the resonant structure and capable of transmitting sound waves to it to make it vibrate at said resonant frequency;
- a sound waves receiver mounted on the resonant structure and capable of capturing sound waves propagating within the suspended structure;
- and connection elements making it possible to connect the at least one transmitter and the receiver to an electronic unit external to the temperature sensor;

characterized in that said connection elements include a connector with four contact points comprising a first and a second contact point for conveying a stereophonic sound signal, a third contact point for providing a reference ground, and a fourth contact point for conveying a microphone signal, said connection elements being configured so as to connect the at least one transmitter to the first and second contact points and to connect the receiver to the fourth contact point.

Some preferred but non-limitative aspects of this sensor are as follows:
- it comprises a transmitter with two electrodes, said connection elements being configured to connect elements of the transmitter to the first and second contact points respectively;
- it includes two transmitters, each provided with two electrodes located on each side of the resonant structure, said connection elements being configured to connect one of the electrodes of one transmitter to the first contact point and one of the electrodes of the other transmitter to the second contact point;
- the receiver is provided with two electrodes, said connection elements being configured to connect one of the receiver electrodes to the third contact point;
- it also comprises a short circuiting circuit configured to short circuit a microphone connected to the temperature sensor by means of a jack socket during a temperature measurement and to disconnect the receiver from the fourth contact point when there is no temperature measurement.

The invention also aims at a method for measuring the temperature by means of the temperature sensor according to the invention, comprising steps consisting of supplying sound wave transmission signals, preferably in phase opposition, on the first and second contact points, collecting a sound waves reception signal on the fourth contact point, and processing the sound waves reception signal to determine a temperature of the resonant structure.

The invention also includes a computer program including code instructions for the execution of steps in the method according to the invention when said program is executed on a computer.

The invention also aims at an electronic unit including a connector with four contact points consisting of first and second contact points intended to convey a stereophonic sound signal, a third contact point that will supply a reference ground and a fourth contact point that will convey a signal from a microphone, characterised in that it is programmed, when the connector of the electronic unit and the connector with four contact points on the temperature sensor are connected to each other, to output sound wave transmission signals on the first and second contact points of the connector, to collect a sound waves reception signal on the fourth contact point of the connector and to process the sound waves reception signal to determine a temperature.

BRIEF DESCRIPTION OF THE DRAWINGS

Other aspects, purposes, advantages and characteristics of the invention will be better understood after reading the detailed description given below of preferred embodiments given as non-limitative examples, with reference to the appended drawings on which.

DETAILED PRESENTATION OF PARTICULAR EMBODIMENTS

Figure 1A:
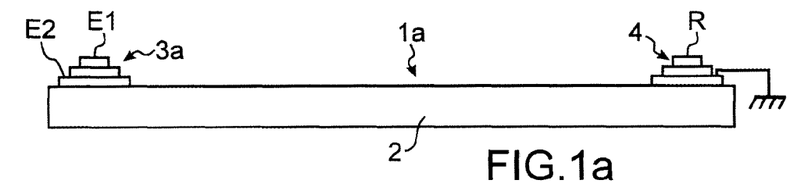
FIGS. 1a and 1b are elevation diagrams of the resonant structure illustrating the position and power supply of signals to the at least one sound waves transmitter and the at least one sound waves receiver according to two possible embodiments of the temperature sensor according to the invention.
Figure 1B:
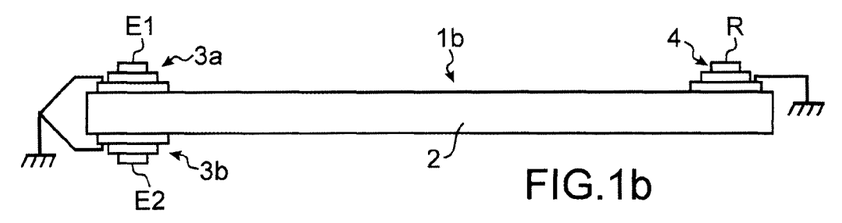

With reference to FIGS. 1a and 1b, the invention discloses a temperature sensor 1a, 1b, comprising:
- a resonant structure 2 that will be vibrated so as to resonate at a resonant frequency that varies depending on the temperature of the resonant structure;
- at least one sound waves transmitter 3a, 3b mounted on the resonant structure 2 and capable of transmitting sound waves to it to make it vibrate at said resonant frequency;
- a sound waves receiver 4 mounted on the resonant structure 2 capable of capturing sound waves propagating within the suspended structure.

The resonant structure 2 is typically a metal or plastic board that propagates an asymmetric Lamb mode $A_0$. The plastic material can be injected or sintered and then metallised, sintering of the powder providing broad freedom for the design of original shapes, particularly to fold the plate. The metal coating, for example brass or gold, makes it possible to prevent dirt accumulation and makes it easier to achieve a uniform temperature in the plate. However, metal is preferred because of its lower thermal inertia. A metal plate also has the advantage that it can be used as a ground plane. Illustrative examples include a brass, aluminium or copper plate, or a plate made of a precious metal such as gold or silver.

The plate 2 is preferably rectangular. Its maximum length may for example be limited to 10 cm such that once it is folded on itself, its size is of the order of 1 to 3 cm, comparable with the size of an audio jack socket.

The plate 2 is preferably narrow, its width typically being between 1 and 10 mm. Similarly, its resonance can be modelled by a single-dimensional resonator and the number of resonance peaks being limited, each peak being well-defined and well-spaced.

The thickness of the plate is preferably adjusted such that its resonant frequency lies in the upper part of the audible spectrum (typically between 10 kHz and 20 kHz). It is of the order of a few tens to a few hundred microns for a metal plate and of the order of one millimeter for a plastic plate. The plate is also thinned so that it can be folded once or several times, so that its overall size and its thermal inertia can be reduced.

The plate is then suspended in a protection chamber. As shown on FIG. 2, the four corners of a rectangular plate can be used as attachment points Fix1-Fix4, since few sound waves pass through these corners. These attachment points can be terminated by small beams in the form of horns so that the plate can be suspended in its protection chamber. Considering its small thickness, it is easy to use photolithography to machine the resonating structure suspended from a peripheral support structure that is itself integrated and fixed in the protection chamber, from the same material. The method consists simply of deep etching to excavate the central plate forming the resonant structure, the attachment beams and the peripheral support structure, from a single material that may for example be metallic and parallelepiped in shape. The length of the beams and the space between the resonant structure and the peripheral support structure can thus be minimised, in other words the characteristic dimension may be comparable to the thickness of the resonant structure.

The at least one sound waves transmitter and the sound waves receiver are each positioned at one end of the long and narrow resonant structure. They are typically piezoelectric transducers, for example buzzers, or PZT ceramics (zirconate, lead titanate) glued to the surface of the resonant structure. The transducers can be glued by a conducting glue onto a metallic plate, or an epoxy glue or a cyanoacrylate glue. They can also be the result of depositions of ZnO (zinc oxide) piezoelectric layers followed by metallisation.

Figure 2:
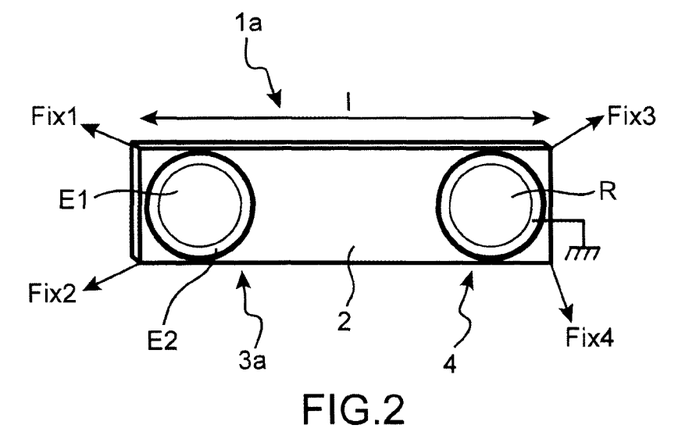
FIG. 2 is a top view diagram of the resonant structure in FIG. 1a illustrating the suspension of the resonant structure.

As shown on FIGS. 1a and 2, in one possible embodiment, the temperature sensor 1a comprises an transmitting transducer 3a mounted on the resonant structure 2, capable of generating waves in the resonant structure over a frequency range including at least one resonant frequency of the resonant structure. The transmitting transducer 3a comprises two electrodes, an upper electrode that receives a sound signal E1 and a lower electrode that receives a sound signal E2. The receiving transducer 4 also comprises two electrodes, an upper electrode outputting a signal R corresponding to the sound waves picked up by the receiver and a lower electrode connected to the ground or the ground plane formed by the resonant structure when it is in the form of a metal plate.

In another possible embodiment shown on FIG. 1b, the temperature sensor 1b comprises two transmitting transducers 3a, 3b mounted on the resonant structure 2. These transducers are arranged facing each other on each side of the resonant structure at one end of it. Each includes an upper electrode and a lower electrode. Each of the two upper electrodes receives a sound signal E1 or E2. The lower electrodes are connected to the ground, possible composed of the metal plate. The receiving transducer is located at the other end of the resonant structure. This embodiment has the advantage that the mode $A_0$ can be better selected, particularly for plastics, and that the amplitude of elastic waves generated in the resonant structure 2 can be doubled.

Figure 3A:
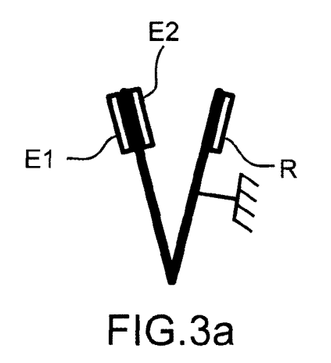
FIGS. 3a and 3b are diagrams illustrating a resonant structure in the form of a plate folded in V and W shapes respectively.
Figure 3B:
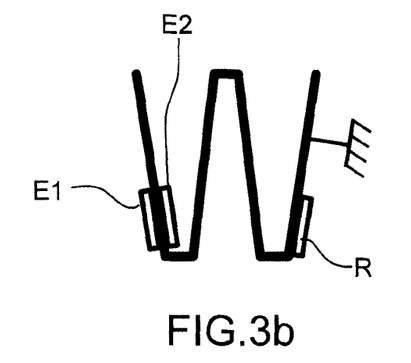

As discussed previously, the resonant structure can be folded on itself so as to multiply its length relative to a plane configuration, while reducing its size. In this respect, FIGS. 3a and 3b illustrate a resonant structure with V and W shapes respectively, in which the length of the plate can be multiplied by two and four respectively. The path followed by sound waves is thus increased, improving the sensitivity of the temperature sensor according to the invention. In one example embodiment, the plate is 50 mm long by 7 mm wide and is folded in 2. It is folded at the middle with a radius of curvature of approximately 3 to 5 mm, 5 to 10 times larger than the thickness of the plate. The inner space is then large enough to accommodate a suspended 4-point jack socket, the usefulness of which will be described below.

For some applications, for example applications pertaining to the health sector and particularly intracorporal measurements, and uses as digital electronic components for printed circuits, it might be desirable to reduce the size of the sensor for example to 3 mm diameter by 5 to 10 mm long so that it can be inserted in a cylindrical tube with a diameter of less than 4 mm. In this configuration, the diameter of piezoelectric transducers does not exceed 2 mm. This has the disadvantage of reducing the amplitude of the reception signal by reducing the input-output insertion efficiency under low load impedance (in other words the ability of the receiver to generate a voltage when it is loaded by a low resistance of the order of one kiloohm). Furthermore, the reduction in the wave length of the resonator must be combined with a reduction in the thickness of the metal sheet to continue working at constant frequency, around 20 kHz.

It might be useful to place transducers at vibration constraint focus points, for example at focal points of an elliptical shaped resonator, to maintain the amplitude of the reception signal. It may also be preferred to place ceramics under the resonant structure rather than on it, to reduced losses generated by suspension beams of the resonant structure and the number of solder points to be made on the sensor during production. The ceramics are then arranged directly on the printed circuit board acting as support, the resonant structure then being located on the ceramics.

One example embodiment is described below. A solder resist mask is created on the printed circuit board side, such that the solder only covers a small part of the surface of the ceramic, for example the equivalent of a 0.1 to 0.5 mm diameter pellet. At the time of melting, PZT pellets float on an approximately 0.1 mm thick solder bed. The other face of the ceramics is also coated with solder paste and the resonant plate is finally placed and suspended on the two PZT pellets. The assembly is then transferred into a melting furnace. A solder point is then created connecting the resonant plate to the ground. This can be done in two ways. In a first case, the ceramic is provided with a silver plated return. There are then two pellets under one of the ceramics. No other connection wires are necessary. The advantage of this configuration is that it limits sound losses, the labour cost and the overall dimension between the resonant plate and the surface of the printed circuit board, typically 0.2 mm, which is the equivalent of the thickness of the ceramic. The total thickness of the sensor is thus reduced, which improves its use as a film sensor and reduces risks of damage in the case of a violent shock (if the sensor is dropped). The distance travelled by bending of the resonant plate is limited either by the printed circuit board or by the protection chamber. In this configuration, the glass-epoxy type circuit board can be replaced by a thin Kapton® film, for example 75 μm thick. According to another embodiment, the ceramics do not have a silver plated return such that the internal faces of the ceramics (those facing the resonant plate) have to be connected to the ground. This can be achieved with a single solder point connecting the resonator to a pellet on the printed circuit board.

More particularly, the invention discloses a temperature sensor using an acoustic method making direct use of the audio port of an electronic unit external to the temperature sensor and programmed to provide sound signals to the at least one sound waves transmitter and to collect the sound signal picked up by the sound waves receiver. The external electronic unit is typically a micro-computer, a tablet computer or a smartphone, and the audio port is a jack port, usually the socket, with four contact points.

To achieve this, the temperature sensor comprises connection elements used to connect the at least one transmitter and the receiver to an electronic unit external to the temperature sensor. These connection elements include a jack plug with four contact ports, typically a male jack as shown in particular on FIG. 5. The four contact points on the plug F comprising first and second contact points E1, E2 for conveying a stereophonic sound signal, a third contact point GND for providing a reference ground, and a fourth microphone contact point for conveying a microphone signal micro, said connection elements being configured so as to connect the at least one transmitter to the first and second contact points and to connect the receiver to the fourth contact point.

The stereophonic sound signal is broken down into a left channel located on the first contact point and a right channel located on the second contact point, these channels being used to apply the sound signals E1 and E2 to the at least one transmitter of the temperature sensor. In other words, the at least one transmitter uses the signals usually sent on a stereo headset, such as an audio hands-free kit with built in microphone (microphone headset) to make the resonant structure vibrate.

The sound signal picked up by the receiver is sent to the external electronic unit making use of the signal normally sent by a microphone, such as the microphone in a hands-free audio kit with built-in microphone.

Resonant frequencies of the resonant structure are then chosen taking account of the limitations of electronic components dedicated to the audio of the external electronic unit. The audio components of a smartphone can be used for sampling frequencies equal to 48 kHz or 96 kHz. Top of the range versions can easily go as high as 192 kHz. Digitisation is done on 16 or 24 quantification bits. Therefore there is a simultaneous limit to the pass band that imposes that resonant frequencies typically have to remain below 20 kHz (in the audible band).

The electricity consumption of the sensor does not exceed one milliampere. In this respect, the use of small piezoelectric ceramics with a total intrinsic capacitance of the order of 5 nF limits the peak current need to 0.6 mA at 20 kHz per Volt of applied voltage. Since the output voltage at the headset terminals of a smartphone or a PC rarely exceed 3 Vpeak, it is deduced that the maximum required rms current is approximately 1.2 $mA_{rms}$ at 20 kHz (and much less by intermittent measurements).

Two load resistances, one at the terminals of the reception transducer and the other at the terminals of the excitation transducers can be provided to prevent pyroelectric and electrostatic shocks that could damage operational amplifiers when the jack plug of the sensor is inserted into the jack socket of the external electronic unit. High value resistances between 100 kohms and 10 Mohms are suitable for excitation transducers. A resistance of at least 1.4 kohms can be provided for the reception transducer so that the electronics unit recognizes the presence of an external microphone. By default, a high or infinite impedance is recognised as an external microphone while a low impedance of less than 1 k or a short circuit activates the internal microphone of the electronic unit because the electronic unit assumes that a 3-point audio headset has been connected or that the "mute" function has been activated using a 50 ohm shunt resistance.

Furthermore, in order to obtain a symmetric resonance peak that can be used to calculate the shift regardless of the input impedance of the sound board in the external electronic unit, it is preferable if the receiver is set to low load impedance, typically 1.5 to 10 kohms for a reason related to the equivalent electrical model of a piezoelectric resonator. This model is characterised by a low impedance at its series resonance and a high impedance at its parallel resonance. It is also required to avoid capacitive coupling with high impedance voltage sources knowing that the input impedance of the operational amplifier associated with a microphone is usually very high. The amplitude of the output signal R(t) thus remains low just before series resonance while parallel resonance after series resonance remains hidden because the load impedance is much smaller than the equivalent electrical impedance associated with the sensor in the case of parallel resonance. Thus, no voltage associated with parallel resonance can be detected. Thus, only series resonance for which the piezoelectric source behaves like a current source is well detected. This configuration is also conducive to a symmetrical resonant peak and improved linearity.

Connection elements can also include a cable to connect the at least one transmitter and the receiver to the jack plug. The use of Teflon FEP materials may be preferred for electrical insulation of internal channels while a flexible silicone coating might be preferred for the external jacket. This coating is preferably thick enough firstly so that the cross-section of the cable can be globally circular with a small diameter (for example 2.5 mm), preferably aesthetically and preventing tangling of the cable, and also to make the cable impermeable by partial trapping/squeezing of the cable at the input to a box accommodating the resonant plate. These two materials can function at peak working temperatures of up to 260° C. Teflon FEP can also be extruded, which is not the case for Teflon PTFE.

The cable is also advantageously composed of two coaxial cables, one assigned to conveyance of transmission signals E1 and E2, and the other to reception of the microphone signal. The core of the coaxial reception cable is connected to the reception signal R(t) while the braid is connected to the ground. This avoids capacitive coupling between the input and the output on very long cables.

Connection elements can also include a multi-channel jack separator in parallel acting as a dispatcher.

Note that there can be inversions between contact points of a jack plug, depending on the manufacturer. Such an inversion can possibly lead to harmful capacitive coupling between the transmission signal and the reception signal. This inversion can be countered by including turning during production.

On the other hand, this special feature can be used to detect a malfunction related to a wiring problem. When the reception signal R(t) passes through the core of the coaxial cable and the braid forms the ground, there is good insulation between input and output: the reception signal is purely piezoelectric and is representative of the series resistance. On the other hand, when the reception signal is connected to the braid and the core forms the ground, capacitive coupling occurs between transmission and reception transducers that is superposed on the piezoelectric signal. The phase of the piezoelectric signal changes sharply at series and parallel resonance, such that interference between the capacitive signal and the piezoelectric signal generates a minimum and a maximum amplitude around the resonant frequency. The presence of resonance and antiresonance close to the nominal frequency is then characteristic of parasite capacitive coupling.

In one preferred embodiment, the external electronic unit is configured so that, during a temperature measurement, it transmits signals E1 and E2 in phase opposition so as to increase the signal generated in the resonant structure. This embodiment also has the advantage that it limits nuisance in telephone conversation mode because the sound signals E1, E2 can then be transmitted in phase which neutralises the transmission of waves in the resonant structure.

In one embodiment, the external electronic unit is configured to determine the temperature of the resonant structure starting from signals originating from the receiver via the fourth contact point and the microphone input of the audio port of the external electronic unit.

In another embodiment, the temperature sensor includes a microcontroller programmed to determine the temperature of the resonant structure. The temperature information thus determined can be sent to the external electronic unit via the fourth contact point. The microcontroller can make use of known temperature measurement means, for example using thermistances or sensors built into the microcontroller. The microcontroller can also generate electrical signals itself to put the resonant structure into resonance and then quantify the resonant frequency of the structure.

In this embodiment, the difference in potential of the stereo signals E1 and E2 can be rectified by a voltage rectifier bridge followed by a reservoir capacitor and a voltage regulator supplying voltage to the low consumption and low voltage microcontroller. The microcontroller thus determines the temperature when it is powered up and transmits it to the external electronic unit, through the fourth contact point of the temperature sensor, by PWM (Pulse Width Modulation) type frequency modulation with low-pass filtering. Therefore signals E1 and E2 are no longer used to excite the elastic waves in the resonant structure, but are used simply to build a power supply source for the microcontroller. This method has the advantage that it makes the temperature sensor fully compatible with simultaneous use of a hands-free kit in musical listening mode.

The measurement can only be activated when the excitation frequency is above the cutoff frequency of a high-pass filter formed at the input to the voltage rectifier bridge. The cutoff frequency is chosen to be above a threshold (for example 15 kHz) starting from which it is known that signals E1 and E2 do not correspond to music signals, to prevent the temperature measurement from being activated by music.

The temperature measurement made using the at least one transmitter excited by signals normally sent on a stereo headset and the receiver sending temperature information on the microphone input of an audio port is as follows.

The temperature is measured by sending a sinusoidal or square frequency modulated pulse, typically covering the range from 5 kHz to 20 kHz, and preferably the variation range of the highest possible resonance peak with the sampling frequency of audio components of the external electronic unit on the envisaged operating temperature range.

The transmitted signals E1 and E2 contain two time periods in which the signal is zero, before and after the pulse. This can firstly avoid dependence on synchronisation questions. Most operating systems can manage processes and respond to interrupt requests with a latency time that may require several tens of milliseconds. It must be certain that digitisation of the signal R at the sampling frequency Fe has begun before the signal E1 is transmitted. Since the exact moment at which digitisation begins is not known, a security period is included much longer than the time to bring the operating system into service. It is then known that acquisition of the signal R is known, except for a translation in time. The Fourier transform of a delayed signal R only introduces a phase shift in the frequencies space, but does not change the modulus of the spectrum. Thus, the fact of working in the frequencies space has the advantage that it makes the system independent of synchronisation signals.

A second advantage is the reduction of secondary lobes in the rectangular window of the Fourier transform (that can be weighted by a Hamming window). The scanning frequency begins at a frequency F1 (for example F1=3000 Hz) at stops at a frequency FN (for example FN=20 000 Hz). The frequency can be incremented according to a law of the following type: Fr=F1 then Fr=Fr+Fr/(NoPrd*2) in which NoPrd denotes the number of periods for each frequency with an initial number of periods equal for example to 50.

Scanning is such that the spectral energy density of the excitation signal is relatively stable, without fluctuating by more than 50% from its average value over the entire variation range of the resonant frequency of the plate. In this way, it is sure that, regardless of the temperature, the signal at the receiver terminals is strong enough so that the shift in the resonance peak from the reference peak identified at a reference temperature TRef1 can be determined. In particular, the piezoelectric conversion efficiency is high enough so that transmission signals E1 and E2 with amplitude 2 Vpp applied to the terminals of transmitting transducers generate a reception signal with sufficient amplitude, comparable with the amplitude of a microphone signal. The audio pulse typically lasts for between 10 ms and 10 seconds depending on the frequency resolution and therefore the required temperature.

There is no need for synchronisation between transmission and reception. As soon as the transmission signal is sent on channels E1 and E2, sampling of the reception signal can start synchronously or asynchronously on the microphone input. During this step, steps will be taken to assure that the acquisition length begins well before transmission and continues well after arrival of the reception signal. In this way, signal processing consisting of "zero padding" is done; in other words adding zero value samples before and after the arrival instant of the reception signal to increase the frequency resolution of the acquisition signal that is analysed by a discrete Fourier transform. Typically, it is required to have a frequency resolution of 1 Hz so that the temperature resolution of the thermometer can be at least one tenth of a degree Celsius. Therefore the acquisition length is typically at least 1 second. In the example given on FIGS. 4a-4c, the acquisition is made over 5 seconds, the frequency resolution is 0.2 Hz and the temperature resolution is a few hundredths of a degree Celsius.

During the measurement, it is also possible to check that the reception signal does not saturate the input of an analogue-digital converter. If necessary, the microphone gain can be reduced and the mean energy of the signal can be calculated starting from the modulus of spectral components of its Fourier transform in the working frequency band. This makes it possible to identify a malfunction of the sensor if the value is too low.

The spectral component with the highest amplitude is then used to normalise the spectrum of the reception signal over the variability range of the resonant frequency. But the spectrum can also be normalised relative to the peak for which the frequency shift is monitored as a function of the temperature. A lower frequency peak can be chosen if it is required to prefer measurement range over temperature resolution.

The spectrum is thus acquired at two reference temperatures Tref1, Tref2, for example at ambient temperature and at 50° C. for metals. It would also be possible to use Tref1 equal to 0° C. and Tref2 equal to 37° C., to monitor frost or the body temperature of a person.

The shift between normalised resonance peaks is quantified by calculating the intercorrelation function of resonance peaks at the two reference temperatures. For metals and injected plastics, it is estimated that the frequency shift is proportional to the working frequency and to the temperature difference and to the coefficient of variation of the temperature of asymmetric waves propagating in the material from which the plate is formed (that can be estimated at slightly less than −0.1%/° C., but that varies from one material to another).

For an unknown temperature Ti, the shift Shift1i that can be positive or negative from one of the reference temperatures is then measured, for example the coldest called TRef1, and linear interpolation is applied to determine the unknown temperature as follows: Ti=TRef1+(TRef2− TRef1)*Shift1i/Shift12.

Three reference temperature are used for sintered plastics for which the temperature behaviour is quadratic, for example −15° C., 20° C. and 50° C., and a quadratic variation law is interpolated for the frequency shift. An unknown temperature is then determined by calculating the shift at temperature Ti from a reference temperature and applying the quadratic correspondence law for this shift.

Two parameters have to be known to calibrate the sensor, firstly the resonant frequency of the resonant plate at a nominal temperature, and secondly the frequency shift coefficient per degree Celsius (about 0.04° C./0.2 Hz for brass). For any one resonant plate, the nominal frequency can fluctuate slightly depending on the precision of sensor positioning (typically positioning within 50 μm), the glue or solder thickness, and the size of solder pads. A bias of 0.2 Hz on the nominal frequency generates a calibration error of 0.04° C. Assuming that fabrication conditions are such that the precision of the nominal frequency is 0.1%, namely 18 Hz for a nominal frequency of 18 kHz, the sensors are then produced with an error on the nominal frequency equivalent to an error of +/−2° C.

One way of improving the precision and for example reducing the error to +1-0.1° C., is to attempt to adjust the nominal frequency over a range of at least about a hundred Hertz once the sensor has been soldered. This can be achieved by mechanical or preferably chemical machining of the resonant plate. Reducing the thickness of a metal plate, for example using an acid, can reduce the working frequency, while reducing the length of the plate increases the working frequency. In one embodiment, a metal adjustment tail a few hundred microns long and about a hundred microns wide is provided at one end of the resonant plate for which the nominal frequency is increased by adjusting the length, while the frequency is reduced when the thickness is reduced. It is seen that for a given material, for example brass, with determined dimensions, it is easy once the sensor has been fabricated to create nomograms to determine the frequency shift that can be obtained, as a function of the exposure time to a given acid with known pH.

Moreover, the nominal frequency of the sensor may tend to reduce with age due to oxidation of the resonant plate and dust that deposits on it, reducing its apparent stiffness. In one preferred embodiment, the resonant plate is protected by a sealed chamber that prevents the settlement of dust and the oxidation process is blocked by protecting the resonant plate by a passivation layer on the resonator. A sensor nominal resonant frequency adjustment coefficient can also be introduced for the sensor as a function of aging of the sensor as calculated from a fabrication date, for example a coefficient of the order of a few ppm/year.

The chamber can also be coated by a silicone coating with a low-pass filter effect of the passive excitation spectrum generated by shocks or mechanical vibrations (such as rough friction on hard or textured surfaces).

Figure 4A:
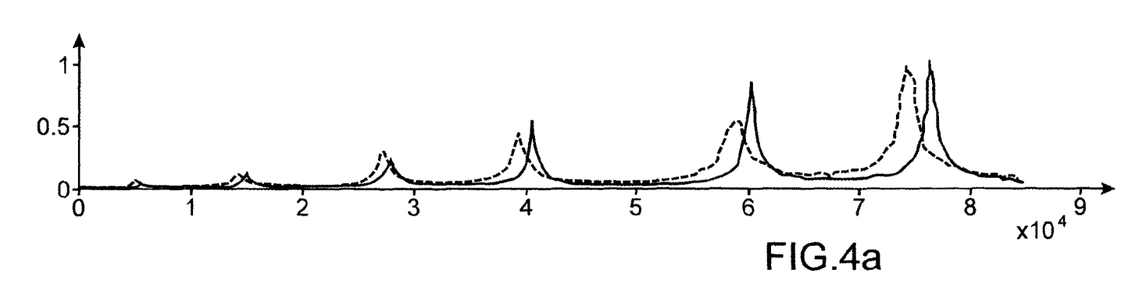
FIG. 4a shows the spectral response of the receiver signal on a wide spectral window, for two temperatures of the resonant structure, namely 23.5° C. and 50° C.

FIG. 4a shows the spectral response of the receiver signal on a spectral window covering the [3 kHz-20 kHz] range, for two temperatures of the resonant structure, namely 23.5° C. (continuous lines) and 50° C. (dashed lines). The acquisition is made over 5 seconds and the spectral resolution is 0.2 Hz. There are thus 85 000 spectral components between 3-20 kHz. The calculation of the shift (as a number of 0.2 Hz components) is made by calculating the intercorrelation function on a 2 kHz window centred around the last peak (around 17 kHz). The shift reaches 2020, namely 404 Hz (equal to 2.3%) on a range of 27° C.

Figure 4B:
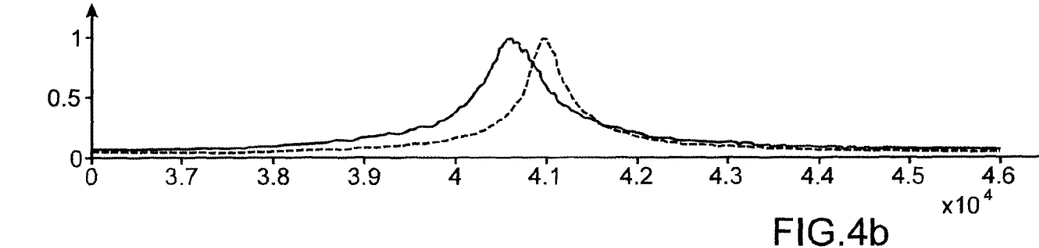
FIG. 4b shows the spectral response of the receiver signal on a spectral window centred at 10.2 kHz, for two temperatures of the resonant structure, namely 23.5° C. and 7.4° C.

FIG. 4b shows the spectral response of the receiver signal on a spectral window with a width of 2 kHz centred at 10.2 kHz, for two temperatures of the resonant structure, namely 23.5° C. (continuous lines) and 7.4° C. (dashed lines). The calculation of the shift (as a number of 0.2 Hz components) is made by calculating the intercorrelation function on a 2 kHz window.

Figure 4C:
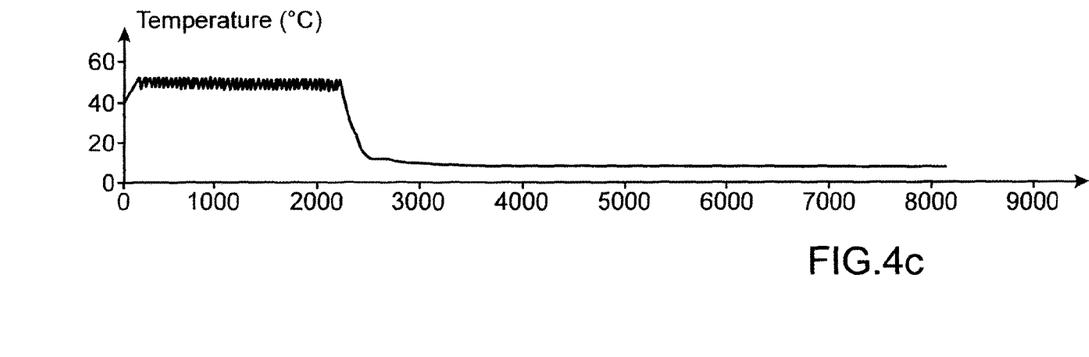
FIG. 4c represents an example temperature measurement made using the sensor according to the invention inserted in a reversible heating-cooling chiller.

FIG. 4c represents an example temperature measurement made using the sensor according to the invention inserted in a reversible heating-cooling chiller. The chiller first controls the heating regulation between 47° C. and 51° C., before changing to cooling mode.

FIG. 4b reveals that the resonance peak becomes wider when the temperature is increased (curve in continuous lines (hot) compared with the curve in dashed lines (cold)). The calculation of a precise shift requires that this widening remains symmetrical about the central frequency. However this widening is also accompanied by a weakening of resonance and the occurrence of distortion peaks reflecting the transmission spectrum. The measurement may then be no longer linear due to the occurrence of local non-linearities over small temperature ranges, even if the slope remains globally linear. Thus, it may be difficult to use measurements above 80° C. for some off-the-shelf epoxy glues.

In order to work over an extended measurement range from −200° C. to +200° C. and to provide good linearity of the device, it is preferable if the peak width is invariable with temperature and therefore that the stiffness of the glue is maintained over the entire temperature range. This condition is fairly well respected with metallic soldering, although it can fluctuate from one polymer glue to another, particularly as a function of the vitreous transition temperature of the glue.

With metal soldering, the maximum operating temperature corresponds either to the melting point of solder (tin-silver eutectic at 217° C. and routinely with other alloys up to 260° C.), or to the Curie temperature of the PZT ceramic (for example around 330° C. for some off-the-shelf PZT ceramics).

When polymer glues are used, it is preferred to use glues that retain good stiffness at high temperatures. The critical parameter of polymer glues is the vitreous transition temperature Tg. High values of Tg occur in polyimide glues and some epoxy glues.

As mentioned above, the resonance peak may be noisy due to secondary distortion peaks that do not shift with temperature. These secondary peaks reflect the content of the excitation spectrum and not the content of mechanical resonance. The reception signal R(t) is expressed by R(t)=E(t)*H(t) in which H(t) is the input-output pulse response of the resonant plate, E(t) is the temporal excitation signal and * designates the convolution product. The result obtained after the Fourier transform has been applied is R(f)=E(f).H(f) in the frequency space.

If the excitation is a frequency modulated pulse between a frequency Fmin and a frequency Fmax, the E(f) signal is not perfectly flat and is bumpy. Around a given resonant frequency $f_0$, $H(f_0)$ is weighted by the excitation spectrum E(f). If resonance is spread over several tens of Hertz, irregularities in the excitation spectrum are found directly in the output spectrum R(f). In order to circumvent this disadvantage, the modulus of the output spectrum R(f) can be normalised by the modulus of the excitation spectrum E(f). When the FFT ("Fast Fourier Transform") algorithm is applied, the two temporal signals (excitation and reception) must have been digitised with the same number of samples so that they share the same frequency components. Nevertheless, from a practical point of view, for the transmission part, it is not absolutely essential to emit a signal with the same duration as the acquisition signal (for example during the 5 seconds of reception). For example, it would be possible to transmit an excitation signal including the required burst between frequencies Fmin and Fmax during 3 seconds, and then mathematically fill in the signal by "zero padding" until 5 seconds to complete it and to have the same number of samples as the reception signal.

In one possible embodiment of the invention, the temperature sensor itself is equipped with an audio port, typically a jack socket with four contact points, on which a stereo headset or a microphone headset can be connected. In anther embodiment, the temperature sensor can be built-in to a stereo headset or a microphone headset, for example contained in the same box as the microphone of a microphone headset.

Considering the case of a microphone headset, and apart from means described below to limit mutual disturbances between the microphone headset and the temperature sensor, the two devices are electrically connected in parallel, in other words the earpieces of the headset with at least one transmitter and the receiver R with the microphone.

It will be seen that the temperature measurement is practically transparent to the user when he is listening to music. The resonant frequency of the plate is chosen to be in the high part of the audible band, or even in the ultrasound band when the audio components of the external electronic unit can handle it. Therefore the temperature measurement signal E1, E2 is almost imperceptible. It can also be superposed on the music signal so that it becomes absolutely imperceptible, although in practice it is preferable to separate the temperature measurement signal and the music signal, therefore to make them mutually exclusive of each other to avoid introducing distortion (knowing that frequency fluctuations are very small, a few ppm per hundredth of a degree Celsius). The choice of whether or not the measurement will be transparent can be made by the user in parameter settings, as a function of the required measurement frequency and temperature resolution.

Furthermore, the required temperature resolution can be configured in a so-called fixed mode with a resolution value fixing the acquisition length and a measurement interval or using any other so-called tuning mode if it is likely that thermal shocks will occur in the environment. In this tuning mode, the acquisition length and the measurement interval are variable. The length is deliberately short at the beginning, for example 0.1 seconds to give priority to the range and to enable an estimate of the temperature within 1° C. as quickly as possible. Then, if the temperature variation remains lower than a given threshold, for example 2° C. between two successive measurements, the length of the acquisition window is progressively extended up to a limiting value defined by another threshold and the measurement interval (that is always greater than or equal to the acquisition length) is also increased, so as to refine the temperature measurement. Conversely, if the temperature measurement changes significantly between two successive measurements, the interval between two temperature measurements is automatically reduced such that the measurement interval is as close as possible to the acquisition length for the current resolution. If the difference between two successive measurements remains less then the current resolution, the acquisition length and therefore the resolution are automatically reduced in steps until the temperature difference between two successive measurements becomes less than a multiple of the current resolution. Range and precision can thus be combined depending on the work environment.

Figure 5:
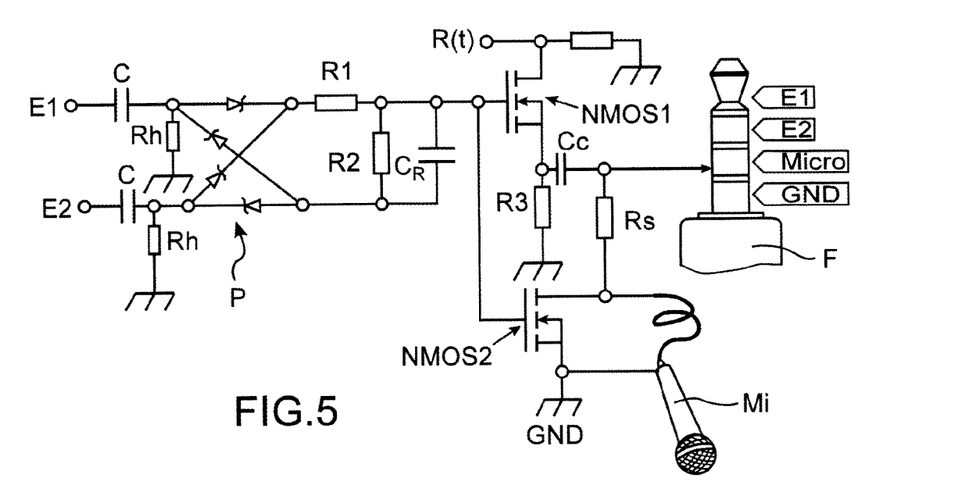
FIG. 5 is an electrical diagram of a selection module that can be integrated into a sensor according to the invention when the sensor is used jointly with a microphone headset (hands-free kit)

An example of means of limiting mutual disturbances of a microphone headset and the temperature sensor is described below with reference to FIG. 5. The temperature sensor includes a module for selecting the "temperature measurement" function or the "use microphone headset" function, for this purpose. This module comprises a circuit to court-circuit the microphone in the microphone headset depending on the nature of signals E1 and E2 output from the first and second contact points, to short circuit the microphone while a temperature measurement is being made and to disconnect the receiver when no temperature measurement is being made.

This circuit can include a high-pass filter for example with a cutoff frequency around 15 kHz and composed of the capacitance C and the resistance Rh. The high-pass filter is followed by a rectifier diodes bridge P acting on the stereo signals E1 and E2 output from the first and the second contact points. The rectifier bridge P is followed by a stage including a bridge with resistances R1 (low) and R2 (high) so that the reservoir capacitance $C_R$ on the output side of the resistance bridge charges quickly and discharges slowly, the reservoir capacitance $C_R$ being used to polarise the gate of a first transistor NMOS1 and a second transistor NMOS2.

The resistance R1 limits the charge current of the reservoir capacitance $C_R$ to a few milliamperes and is typically equal to 1 kohm, while the reservoir capacitance $C_R$ is typically equal to 1 µF. The time to charge to 95% is then around 30 ms. Resistance R2 controls the discharge time of the reservoir capacitance $C_R$ and therefore the opening time of the transistors and is typically equal to 1 to 10 Mohms, with an opening duration of the order of one second.

When signals E1 and E2 output from the first and the second contact points are in phase opposition at a frequency higher than the cutoff frequency of the high-pass filter, the differential is large enough to make transistors NMOS1 and NMOS2 conducting.

In becoming conducting, the first transistor NMOS1 connects the receiver of the temperature sensor that outputs the signal R to the fourth "Microphone" contact point and then to the microphone input of the PC or the smartphone. A decoupling capacitor Cc is provided on the source side of the first transistor NMOS1 to prevent its source voltage from becoming similar to the gate voltage, which would prevent the first transistor NMOS1 from becoming conducting.

Furthermore, to prevent the microphone Mi of the microphone headset from disturbing the measurement, the same gate voltage is used to switch the second transistor NMOS2 connected as load impedance of the microphone Mi, to the ground. There is a series resistance Rs on the output side of the second transistor NMOS2 connecting the microphone Mi to the fourth contact point.

Thus, when no temperature measurement is being made, the microphone Mi is always connected normally through the series resistance Rs (about 1 kohm) while the receiver R is loaded with a high electrical impedance and is therefore not connected. In temperature measurement mode, the stereo signals E1 and E2 are in phase opposition. The first transistor NMOS1 is conducting because its threshold voltage is low and typically less then 2V, which connects the receiver R to the fourth contact point, while the second transistor NMOS2 associated with the microphone Mi is short circuited to the ground. The receiver R is then loaded by the series resistance Rs, one of the terminals of which is connected to the ground.

Therefore the microphone Mi is inactive while a temperature measurement is being made. This situation is satisfactory because there are no telephone conversations and the entire temperature measurement operation does not last for more than a few hundred milliseconds. As soon as the measurement is finished, the stereo transmission with E1 and E2 in phase opposition stops and the gate voltage of transistors NMOS 1 and NMOS2 drops, which reconnects the microphone Mi and disconnects the receiver R.

In music listening mode, the phase shift between signals of the right and left channels is arbitrary. There is a non-zero probability that the signals are in phase opposition and that the microphone Mi is inactive. But this is not a problem because in this case it is unused.

When a telephone conversation is started, the smartphone or PC operating system is informed if a temperature measurement process is in progress. It can take control and give priority to telephone mode. It takes not more than a second to deactivate the temperature sensor, which is equal to the time to discharge the gate voltages of transistors NMOS1 and NMOS2.

Headset signals are then sent in phase. Therefore it is very unlikely that the sound signals of a telephone conversation will contain opposite electric phases for a sufficiently long time to activate transistors NMOS 1 and NMOS2 and deactivate the microphone, which would constitute a malfunction.

It will also be noted that several temperature sensors can be electrically connected in parallel while being physically connected in series. As shown on FIG. 6, instead of connecting a microphone headset in series, the sensors C1 and C2 can be inserted with some behind others. Each sensor can be associated with a resonant structure with its own natural frequency. For example, it can be chosen to adjust the length and thickness of a plate so that its frequency is different from the plate of the next sensor, for example with an interval of 500 Hz from the next plate.

Figure 6:
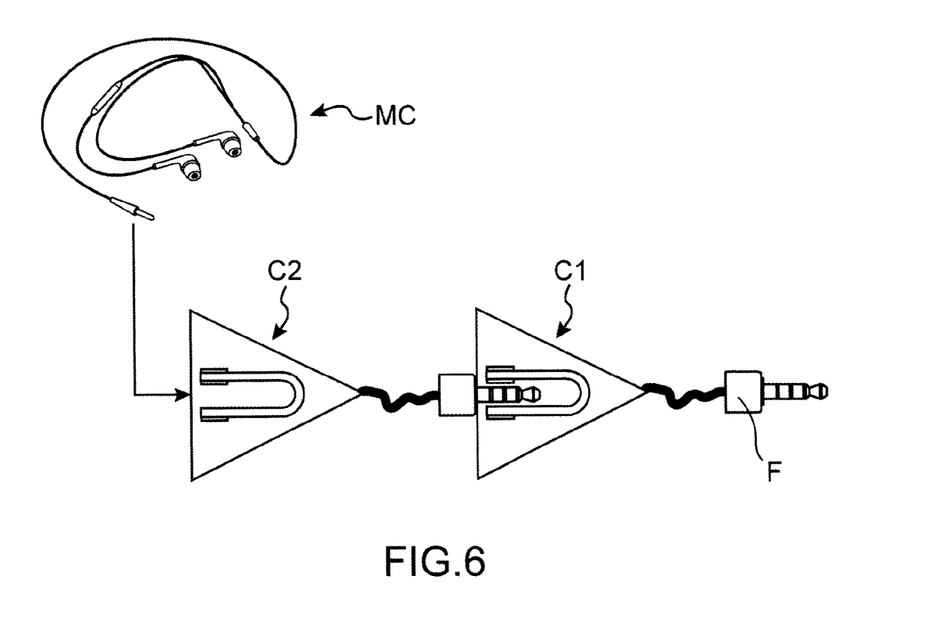
FIG. 6 is a diagram illustrating an example of a series structure including two temperature sensors according to the invention and a microphone headset.

A system with two groups of N sensors can also be formed. The two groups share the same frequency ranges, but the sensors in the first group are powered only with the Right signal E1(t) and the sensors in the second group are powered with the Left signal E2(t). In each group, the thickness and/or length of the resonant plate of each sensor can be slightly different from the others such that each can be identified on its own working frequency range from 500 Hz to 2 kHz corresponding to the required shift range on the required working temperature range. The measurement is made simultaneously for all sensors in the same group. There is only one reception signal R(t) for all sensors connected in parallel. Groups are measured sequentially.

The minimum configuration consists of two groups of N=1 sensors. All the sensors are identical. One is connected to the Right earpiece, and the other to the Left earpiece. The internal electrode in each transmitting transducer is grounded. Receiving transducers are connected in parallel and output the same signal R(t). In this configuration, there is no difference in operation when the signals E1 and E2 are in phase or in phase opposition.

The invention is not limited to the temperature sensor as described above but it may also include a method of making a temperature measurement using such a temperature sensor, the method including steps as follows:

output sound wave transmission signals, preferably in phase opposition, on the first and second contact points of the sensor plug;

collect a sound wave reception signal on the fourth contact point of the sensor plug;

process the sound waves reception signal to determine a temperature of the resonant structure.

The invention also includes a computer program including code instructions for the execution of steps in this method when said program is executed on a computer.

And the invention also includes the external electronic unit to which the temperature sensor can be connected through its plug with four contact points that is connected to a connector with four contact points in the electronic unit, typically a jack socket. When the electronic unit connector and the temperature sensor plug are connected to each other, the electronic unit is configured to output sound wave transmission signals on the first and second contact points of its plug, to collect a sound waves reception signal on the fourth contact point of its connector and to process the sound waves reception signal to determine the temperature of the resonant structure of the temperature sensor.

The invention claimed is:

1. A temperature sensor comprising:
    a resonant structure configured to be vibrated to resonate at a resonant frequency that varies as a function of temperature of the resonant structure;
    at least one sound waves transmitter mounted on the resonant structure and configured to transmit sound waves to the resonant structure to make the resonant structure vibrate at the resonant frequency;
    a sound waves receiver mounted on the resonant structure and configured to capture sound waves propagating within the resonant structure; and
    connection elements configured to connect the at least one transmitter and the receiver to an electronic unit external to the temperature sensor;
    wherein the connection elements include a connector including four contact points, the four contact points including a first and a second contact point for conveying a stereophonic sound signal, a third contact point for providing a reference ground, and a fourth contact point for conveying a microphone signal, and
    wherein the connection elements are configured to connect the at least one transmitter to the first and second contact points and to connect the receiver to the fourth contact point.

2. The temperature sensor according to claim 1, wherein the at least one sound waves transmitter includes a transmitter including two electrodes, and wherein the connection elements are configured to connect each of the two electrodes of the transmitter to a respective one of the first and second contact points.

3. The temperature sensor according to claim 1, wherein the at least one sound waves transmitter includes two transmitters, each of the two transmitters including two electrodes located on each side of the resonant structure and in which the connection elements are configured to connect one of the two electrodes of a first one of the two transmitters to the first contact point and one of the two electrodes of the other one of the two transmitters to the second contact point.

4. The temperature sensor according to claim 1, wherein the sound waves receiver includes two electrodes, and wherein the connection elements are configured to connect one of the two electrodes of the sound waves receiver to the third contact point.

5. The temperature sensor according to claim 1, wherein the resonant structure is a rectangular plate.

6. The temperature sensor according to claim 1, wherein the at least one sound waves transmitter and the sound waves receiver are installed on the resonant structure by gluing.

7. The temperature sensor according to claim 1, wherein the at least one sound waves transmitter and the sound waves receiver are piezoelectric transducers.

8. The temperature sensor according to claim 1, further comprising a chamber in which the resonant structure is suspended.

9. The temperature sensor according to claim 1, further comprising a jack socket.

10. The temperature sensor according to claim 9, further comprising a short circuiting circuit configured to short circuit a microphone connected to the temperature sensor by the jack socket during a temperature measurement and to disconnect the sound waves receiver from the fourth contact point when no temperature measurement is being made.

11. A microphone headset comprising a built in sensor according to claim 1.

12. A temperature measurement method using the temperature sensor according to claim 1, comprising:
    outputting sound wave transmission signals on the first and second contact points;
    collecting a sound waves reception signal on the fourth contact point;
    processing the sound waves reception signal to determine a temperature of the resonant structure.

13. The temperature measurement method according to claim 12, wherein the sound wave transmission signals outputted on the first and second contact points are in phase opposition.

14. A non-transitory computer program product including computer code instructions for execution of temperature measurement method according to claim 12 when the program is executed on a computer.

15. An electronic unit comprising:
    an electronic unit connector including four contact points including a first and a second contact point to convey a stereophonic sound signal, a third contact point to provide a reference ground, and a fourth contact point to convey a microphone signal,
    wherein, when the electronic unit connector and the connector with four contact points of the temperature sensor according to claim 1 are connected to each other, the electronic unit is configured to output sound wave transmission signals on the first and second contact points of the electronic unit connector, to collect a sound waves reception signal on the fourth contact point of the electronic unit connector, and to process the sound waves reception signal to determine a temperature.

* * * * *